(12) United States Patent
Palmer (10) Patent No.: US 6,253,065 B1
(45) Date of Patent: Jun. 26, 2001

(54) WIRELESS COMMUNICATIONS NETWORK PLANNING

(75) Inventor: Derek Anthony Palmer, Ipswich (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/091,750

(22) PCT Filed: Apr. 23, 1998

(86) PCT No.: PCT/GB98/01180

§ 371 Date: Jun. 24, 1999

§ 102(e) Date: Jun. 24, 1999

(87) PCT Pub. No.: WO98/49853

PCT Pub. Date: Nov. 5, 1998

(30) Foreign Application Priority Data

Apr. 25, 1997 (EP) .................................................. 97302836

(51) Int. Cl.⁷ .................................................. H04M 15/00
(52) U.S. Cl. .......................... 455/67.3; 455/67.6; 455/63; 455/445; 455/446; 455/423
(58) Field of Search .................................. 455/423, 446, 455/445, 63, 67.3, 67.6

(56) References Cited

U.S. PATENT DOCUMENTS

| | | | | |
|---|---|---|---|---|
| 5,463,673 | * | 10/1995 | Herscovici | 455/446 |
| 5,491,837 | | 2/1996 | Haartsen . | |
| 5,497,505 | | 3/1996 | Koohgoli et al. . | |
| 5,551,064 | | 8/1996 | Nobbe et al. . | |
| 5,623,429 | * | 4/1997 | Fortune et al. | 364/578 |
| 5,828,962 | * | 10/1998 | Ho-A-Chuck | 455/446 |
| 5,946,612 | * | 8/1999 | Johansson | 455/405 |
| 5,960,329 | * | 9/1999 | Ganesh et al. | 455/67.1 |

FOREIGN PATENT DOCUMENTS

| | | | |
|---|---|---|---|
| 0 720 407 | 7/1996 | (EP) . | |
| 98/14025 | * 4/1998 | (FI) | H04Q/7/38 |
| 2 265 525 | 9/1993 | (GB) . | |
| 92/06541 | 4/1992 | (WO) . | |
| 96/35305 | 11/1996 | (WO) . | |
| 98/14025 | 4/1998 | (WO) . | |

OTHER PUBLICATIONS

Joseph Kennedy and Mark C. Sullivan, 'Direction Finding and 'Smart Antennas' Using Software Radio Architectures', IEEE Communications Magazine, May 1995.

S.K. Oh and C.K. Un, 'Simple Computational Methods of the AP Algorithm for Maximum Likelihood Localisation of Multiple Radiating Sources', IEEE Trans. on Signal Processing, vol. 40, No. 11, Nov. 1992, pp. 2848–2854.

Maximum Likelihood Localisation of Sources by Alternating Projection, IEEE Trans. on Acoustics, Speech and Signal Processing, vol. 36, No. 10, pp. 1553–1560, Oct. 1998.

J.M. Chervatin, 'La planification radioélectrique: un processus continu', 316 Commutation & Transmission 16 (1994) No. 3, Paris, FR pp. 31–40.

* cited by examiner

Primary Examiner—Daniel Hunter
Assistant Examiner—Alan T. Gantt
(74) Attorney, Agent, or Firm—Nixon & Vanderhye P.C.

(57) ABSTRACT

The amount of communications traffic that would be handled by an additional transceiver placed within a communications network having a number of existing base transceiver stations is established. An interfering signal is transmitted from a proposed transceiver location and, relying on recording equipment connected to the base station, the reports of mobile phones concerning the quality of the downlink communication channel from the base station to them is logged.

18 Claims, 6 Drawing Sheets

| Carrier | T-slot | T Adv. | Time (ms) | RX_Qual | Time (ms) | RX_Qual | Time (ms) | RX_Qual | Time (ms) | RX_Qual | Time (ms) | RX_Qual |
|---|---|---|---|---|---|---|---|---|---|---|---|---|
| 1 | 1 | n/a | 0 | n/a | 480 | n/a | 960 | n/a | 1440 | n/a | 1920 | n/a |
| 1 | 2 | 0 | 30 | 0 | 510 | 0 | 990 | 0 | 1470 | 0 | 1950 | 0 |
| 1 | 3 | 1 | 60 | 1 | 540 | 3 | 1020 | 3 | 1500 | 3 | 1980 | 0 |
| 1 | 4 | 1 | 90 | 2 | 570 | 7 | 1050 | 5 | 1530 | 5 | 2010 | 0 |
| 1 | 5 | 0 | 120 | 0 | 600 | 0 | 1080 | 0 | 1560 | 0 | 2040 | 0 |
| 1 | 6 | 0 | 150 | 0 | 630 | 0 | 1110 | 0 | 1590 | 0 | 2070 | 0 |
| 1 | 7 | 0 | 180 | 0 | 660 | 0 | 1140 | 0 | 1620 | 0 | 2100 | 0 |
| 1 | 8 | 0 | 210 | 0 | 690 | 0 | 1170 | 0 | 1650 | 0 | 2130 | 0 |
| 2 | 1 | 0 | 240 | 0 | 720 | 0 | 1200 | 0 | 1680 | 0 | 2160 | 0 |
| 2 | 2 | 1 | 270 | 0 | 750 | 0 | 1230 | 4 | 1710 | 6 | 2190 | 4 |
| 2 | 3 | 1 | 300 | 0 | 780 | 0 | 1260 | 0 | 1740 | 0 | 2220 | 0 |
| 2 | 4 | 1 | 330 | 0 | 810 | 0 | 1290 | 0 | 1770 | 0 | 2250 | 0 |
| 2 | 5 | 1 | 360 | 0 | 840 | 0 | 1320 | 5 | 1800 | 6 | 2280 | 4 |
| 2 | 6 | 0 | 390 | 0 | 870 | 0 | 1350 | 0 | 1830 | 0 | 2310 | 0 |
| 2 | 7 | 1 | 420 | 0 | 900 | 0 | 1380 | 0 | 1860 | 0 | 2340 | 0 |
| 2 | 8 | 1 | 450 | 0 | 930 | 0 | 1410 | 0 | 1890 | 0 | 2370 | 0 |

Fig. 4

| Carrier | T-slot | T Adv. | Time (ms) | RX_Qual | Time (ms) | RX_Qual | Time (ms) | RX_Qual | Time (ms) | RX_Qual | Time (ms) | RX_Qual |
|---|---|---|---|---|---|---|---|---|---|---|---|---|
| 1 | 1 | n/a | | | 480 | n/a | | | | | | |
| 1 | 2 | 0 | | | 510 | 5 | | | | | | |
| 1 | 3 | 1 | | | 540 | 0 | | | | | | |
| 1 | 4 | 1 | | | 570 | 0 | | | | | | |
| 1 | 5 | 0 | | | 600 | 6 | | | | | | |
| 1 | 6 | 0 | | | 630 | 0 | | | | | | |
| 1 | 7 | 0 | | | 660 | 6 | | | | | | |
| 1 | 8 | 0 | | | 690 | 0 | | | | | | |
| 2 | 1 | 0 | | | | | | | 1680 | 6 | | |
| 2 | 2 | 1 | | | | | | | 1710 | 0 | | |
| 2 | 3 | 1 | | | | | | | 1740 | 5 | | |
| 2 | 4 | 1 | | | | | | | 1770 | 0 | | |
| 2 | 5 | 1 | | | | | | | 1800 | 0 | | |
| 2 | 6 | 0 | | | | | | | 1830 | 5 | | |
| 2 | 7 | 1 | | | | | | | 1860 | 0 | | |
| 2 | 8 | 1 | | | | | | | 1890 | 0 | | |

Fig. 5

Fig. 6 ns NETWORK
WIRELESS COMMUNICATIONS NETWORK PLANNING

BACKGROUND OF THE INVENTION

1. Field of the Invention

The present invention relates to a method of estimating the amount of communications traffic that would be routed via a transceiver installed at a proposed transceiver location within the coverage area of an existing communications network. The invention has particular utility in relation to determining the most suitable location for, and characteristics of, a microcell-providing transceiver prior to its installation in a cellular telephone network.

2. Related Art

The last few years have seen a strong growth in the use of mobile telephones. Initially, each network operator enabled a mobile telephone service by installing a number of transceivers spaced around the region in which the service was to be made available. These transceivers typically had a range of between one kilometre and several tens of kilometres. In order to maximise the number of simultaneous calls that could be handled by the network, each transceiver was arranged to operate at a set of frequencies different from the frequencies used by each of its neighbours.

Further growth in the number of mobile telephone users meant that network operators had to divide the cells surrounding the transceivers into a plurality of sectors. Again, the frequencies allotted to the different sectors were chosen to be different from those used in neighbouring sectors. By decreasing the size of the areas in which a given set of frequencies was used, the network operators were able to further increase the capacity of their network.

Nevertheless, particularly in urban areas, even this increase in capacity has not been sufficient to cope with the rising demand. Hence many network operators are now installing low power radio transceivers which handle calls in progress within 100 or 200 metres of the transceiver. These low power transceivers are most usefully employed in areas where the number of calls made is exceptionally high, e.g. at railway stations or in shopping centres.

In order for a newly installed low power radio transceiver to be as effective as possible, it is important to position it and configure its characteristics so that it handles as many calls as possible. One example of a characteristic that can be controlled is the size and shape of the coverage area served by the transceiver.

Many conventional techniques for choosing the best location for a additional transceiver involve identifying the sectors or cells of the network which are heavily loaded and then intuitively guessing a number of possible locations for a transceiver from topographical maps of the local area. Having identified such candidate locations, traffic measurements can be made at each of the locations and the most suitable one determined.

One method that might be used to determine the number of calls that would be handled by a transceiver placed at one of the candidate locations would be to place, at the candidate location, an apparatus which emulates most of the functions of an operational transceiver but which is unable to have calls handed over to it. Such an apparatus could be set up to communicate to a mobile switching centre the strength of signals from nearby mobile units. By analysing the data received, the number of calls which would have been routed via the transceiver had it been fully operational can be determined. An example of this technique is seen in International Patent Application WO 96/35305.

However, the present inventor has realised that such a method and apparatus is unnecessarily time-consuming, complex and expensive.

SUMMARY OF THE INVENTION

According to a first aspect of the present invention, there is provided a method of estimating the amount of communications traffic that would be routed via an additional transceiver installed at a candidate transceiver location within the coverage area of a communications network having one or more network transceivers for providing wireless communication between the network and mobile communication units, the mobile units being operable to send reception data concerning downlink reception to the network, said method comprising the steps of:

operating a transmitter to transmit an interference signal from said candidate location to interfere with reception by mobile units within range of the transmission; and analysing at least reception data concerning downlink reception during periods associated with transmission of said interference signal to find a measure indicative of the amount of communications traffic affected by said interfering transmission; and thereby estimating the amount of communications traffic that would be routed via said additional transceiver installed at said proposed location. Although early mobile telephone network standards (e.g. Total Access Communications System, or TACS) did not require mobile phones using the network to transmit any data relating to the quality of the signals they were receiving, more recent telephone network standards (including the Groupe Speciale Mobile (GSM) standard used across Europe and in Japan) require data concerning the quality of reception to be transmitted by the mobile phone to the network (where that data is then passed on to mobile switching centres). It is likely that future mobile telephone networks will also include such a reception data transmission and forwarding capability. Future mobile networks may also store the reception data. The present inventor has realised that by transmitting an interfering signal from the proposed location of the low power transceiver, the call monitoring capability already provided in the network can be used in establishing the number of calls that would be routed via a transceiver placed in that location.

Thus, the present invention provides a method allowing the determination of the number of calls that would be routed by a transceiver at a proposed location, which is furthermore economical and easy to use. Because it is economical and easy to use more candidate locations can be evaluated than has hitherto been possible, thereby improving the estimate of the best location for a additional transceiver.

Preferably, said interfering signal transmission step comprises transmitting said interfering signal for one or more spaced time periods, each being less than ten seconds in duration.

By limiting the interfering signal to bursts of short duration, the degradation in the quality of service provided to the customers of the network can remain within acceptable bounds. Clearly, the shorter the duration of each burst, the less noticeable is the effect on the customer's service. Nevertheless, the burst must be of a duration which is sufficiently long to cause a noticeable effect in the data concerning downlink reception. A preferred duration is less than 2.5 seconds, most favoured durations lie between 0.75 and 1.25 seconds.

In preferred embodiments of the invention, said network comprises a plurality of network transceivers, each being allotted one or more frequency bands, and communicating with mobile units currently routed via them by transmitting and receiving signals within said frequency bands; and said transmission step comprises transmitting a signal to interfere selectively with one or more frequency bands allotted to respective chosen transceivers and thereby estimate the amount of communications traffic which would be routed via the transceiver installed at said proposed location instead of being routed via one or more chosen transceivers.

The method of the present invention becomes more useful, if, in addition to finding the amount of traffic which will be routed via the additional transceiver, it is also established from which of the neighbouring cells that traffic would be taken. This enables a network planner using the method of the present invention to route traffic away from a congested cell in the network.

Another preferred embodiment of the present invention involves a method where said transmission step comprises:

transmitting a first interfering signal having a first power;

transmitting a second interfering signal having a second power; and said analysing step further comprises the step of calculating respective measures indicative of the amount of communications traffic affected by the first and second interfering signals and thereby estimating the respective amounts of communications traffic that would be routed via said additional transceiver transmitting at the first and second power installed at said proposed location.

This feature enables those planning the location of a additional transceiver to experiment to find an ideal power for that transceiver. Data representing the number of communication links affected can be plotted against the power of the interfering burst, whereby it can be established at which power the additional transceiver is most efficient in terms of the number of calls routed through it in relation to the amount of power it consumes and the amount of co-channel interference it causes.

In an analogous way, it is advantageous to vary the shape of the area served by the additional transceiver. This might, for example, be achieved using a directional antenna such as a YAGI antenna.

The above procedures become more useful when the first and second interference signals are interposed between one another. In that case, two sets of data can be obtained relating to the same test period. This not only means that the two data sets are directly comparable, but also that two possible powers/directional characteristics for the additional transceiver can be assessed during a single test period. Thus, in a given time, more possible powers for the apparatus can be investigated. Hence, it is likely that a better estimate of an ideal power/directional characteristic for the additional transceiver will be found in a given time.

In some embodiments, the transmitting step comprises transmitting an interference signal from first and second candidate locations, the interference signals from the first location being interposed with the interference signals from the second location; and the method further comprises the step of switching the output of said transmitter apparatus between said first and second location. This means that two locations can be investigated within the same test period. Following reasoning analogous to that given above, a better estimate of an ideal location for the additional transceiver can therefore be made on the basis of tests carried out over a given period.

Preferably, said analysis step further comprises analysing reception data concerning one or more time periods adjacent to the periods associated with the transmission of the interfering signal. This has the advantage that the effects of interference from sources other than the interfering transmitter can be recognised as such and discounted.

This can be achieved in another way if said mobile units are further operable to send data to the network, indicative of their distance from the transceivers which are currently handling them, said method might then further comprise the step of analysing said distance data to discount, in finding said measure, communication traffic for which said distance data is inconsistent with the estimated extent of interfering signal transmission.

According to a second aspect of the present invention there is provided a transmitter comprising:

means arranged in operation to generate a predetermined interference signal means arranged in operation to transmit an electromagnetic signal based on said interference signal to interfere with communication between one or more mobile communication units and a communications network, said communications network comprising: one or more network transceivers for providing wireless communication between the network and mobile communication units, the mobile units being operable to send data concerning downlink reception to said data storage means.

'Predetermined' here means that the form of the interfering signal is determined by the physical nature of the transmitter apparatus. An existing base station in a mobile telephony network transmits an electromagnetic signal which is, at least in part, determined by the user communication it is relaying to or from the network. Hence an existing base station cannot be said to generate a predetermined interference signal although it might be that the effect of the signal is to interfere with other mobile telephony channels accidentally.

Such an apparatus is useful in carrying out the method of the present invention. According to a third aspect of the present invention, there is provided a program storage device readable by a processing apparatus, said device tangibly embodying a program of instructions executable by a processor to perform method steps for carrying out the reception data analysis step of the method of the present invention, said method steps comprising:

obtaining data representing the time and duration of said interfering signal transmissions;

obtaining downlink reception quality data measured during interfering signal transmissions;

counting the number of occasions on which quality falls below a predetermined threshold, and thereby obtaining a measure of the amount of traffic affected by said interfering signal.

The advantage of providing a program storage device as set out above is that the data concerning downlink reception quality might be downloaded to a computer which can then be operated under control of the program stored on the program storage device to obtain quickly a measure of the amount of traffic affected by the interfering signal.

Advantageously, said method steps may further comprise:

obtaining data representing a distance between the network transceiver and the mobile unit operating over said communications link; and said counting step comprises counting only those downlink reception quality data measurements where said quality falls below said predetermined threshold and said distance data falls within a range consistent with the location of a coverage area of said interfering signal.

The advantage of the additional step is that by determining the distance of the affected communications links from the existing network transceivers, it is possible to discount effects on the downlink communication quality which have been caused by anything other than the transmission of the interfering signal.

BRIEF DESCRIPTION OF THE DRAWINGS

There now follows, by way of example only, a description of specific embodiments of the present invention. The description is given with reference to the accompanying drawings, in which.

DETAILED DESCRIPTION OF EXEMPLARY EMBODIMENTS

Figure 1:
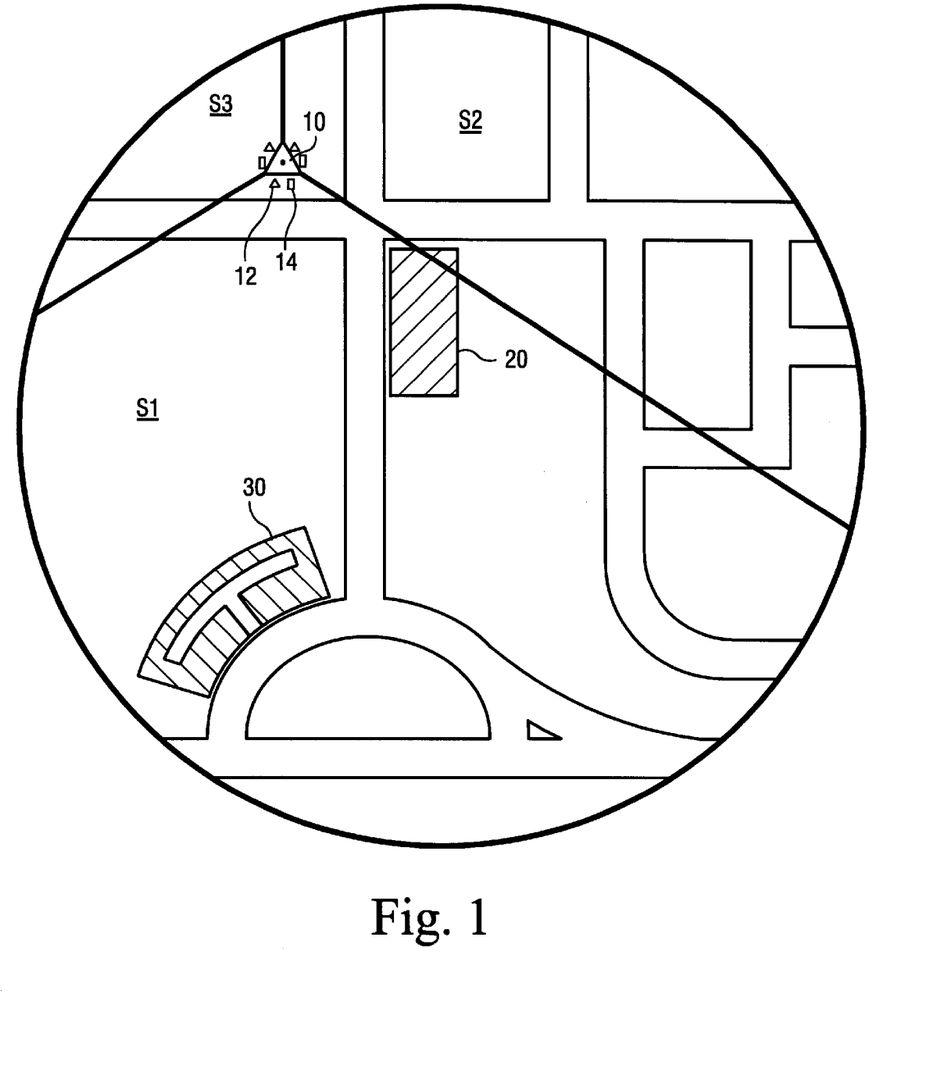
FIG. 1 is a map illustrating a congested cell which covers two possible hotspot sites.

An area covered by a cellular mobile phone network manufactured and operated in accordance with the GSM standard is illustrated in FIG. 1. Mobile phone communication links in the area are provided by a base transceiver station 10. The base station 10 receives communication signals via the network, converts them to radio signals and sends the radio signals to mobile phones in the area. The base station 10 also receives radio signals transmitted from those mobile phones and converts them into communication signals and sends them via the network towards their destination. As is normal, base transceiver station 10 includes a supporting structure which is substantially triangular in plan constructed on the top of a high building. Each of the three sides of the structure has a pair of antennas 12,14 mounted thereon. The pair comprises a receiver antenna 12 and a transmitter antenna 14 (As will be known by those skilled in the art, there is often a further receiver antenna, the antenna providing the better reception being used at any one time). The range of the radio signals transmitted from the transmitter antenna 14 is around a kilometre. Hence each pair of antennas 12,14 serve a sector S1, S2, S3 which has the shape of a 120 degree segment of a circle of 1 kilometre radius.

The transmitter antenna 14 transmits signals in two different frequency bands. These frequency bands are known as transmit carrier bands to those skilled in the art. Each carrier band is in turn divided into timeslots of 577 microsecond duration. Every eighth one of these timeslots is dedicated to a particular communications channel. Hence there are eight separate channels for communication within each carrier band. One channel on one of the carriers is a broadcast control channel (BCCH) which is received by all mobile phones in operation within the sector.

For each of the two transmit carrier bands allotted to transmission from the base station 10 to mobile phones within the sector S1, there are corresponding carrier bands allocated to transmission from the mobile phones in the sector to the base station 10. These receive carrier bands are spaced in frequency from the transmit carrier bands by a fixed amount.

The receiver antenna (FIG. 2B, 12) has a coaxial output cable which leads to two receivers. One of the receivers is operable to select signals within a first one of the receive carrier bands, the other is operable to receive signals within the second receive carrier band. The communications signals obtained are then time division multiplexed onto a communications link 17 which leads to a base station controller (not shown). A connector 18 allowing the attachment of testing equipment is provided on the communications link 17.

The communications link between the base transceiver station 10 and mobile phones is known as a downlink and the communications link between the mobile phones and the base transceiver station 10 is known as an uplink. Hence, the sector S1 is provided with 16 downlink channels (one of those channels being the BCCH) and 16 uplink channels (one of those being a shared control channel). A feature of mobile telephone networks that are operated according to the GSM standard is that, in use, each of the mobile phones sends data concerning the quality of the downlink communication to the base transceiver station that is currently serving it. This data is sent together with the voice data in the uplink channel allocated to a phone. In particular, the data includes a three-bit value representing the bit error rate in the signal being received from the base transceiver station. A zero value indicates that the bit error rate is low and that the quality of the downlink communication is very good whereas a value of seven indicates that the bit error rate is very high and that call quality is at an unacceptably low level. The three-bit value, known as the RX_QUAL value, is sent at 480 ms intervals and represents the average quality of the downlink communication over the immediately preceding 480 ms period.

On receipt of such data, the base station 10 relays speech data and the data concerning the quality of downlink reception to the base station controller (not shown) via the communications link 17.

Hereinafter, it is assumed that a base station serving a sector that is served by two transceivers receives RX_QUAL data from each mobile phone which it is handling in turn. It is furthermore assumed that these RX_QUAL reports are spaced by 30 ms intervals.

A further element of data that is measured and sent by the mobile phones to the base station controller in GSM networks (via the base station) is the 'timing advance' for each mobile phone operating within the cell. This is a number between 0 and 63 (i.e. it is stored as a 6-bit value) and represents the time taken for a signal to travel between the base transceiver station 10 and a mobile phone. It is approximately true to say that multiplying the timing advance value by 0.5 km gives the distance between the mobile phone and the base transceiver station.

The equipment used in carrying out the method of the present embodiment comprises a transmitter apparatus (FIG. 2A) and a monitoring apparatus (54). The transmitter apparatus (FIG. 2A) comprises a digital signal generator 40 (for example a Rohde and Schwarz SME) which is capable of outputting a Gaussian minimum shift keying (GMSK) digital signal representing a pseudo-random sequence of bits. The digital signal generator 40 is connected to a controller PC 50 via an IEEE488 interface. Software on the PC 50 can be executed to cause the PC 50 to prompt the operator to input a value representing the carrier band(s) with which it is desired to interfere and also at what times it is desired to transmit the interfering bursts. Those skilled in the art will readily be able to provide programs suitable to control the PC to carry out the above process steps.

Figure 2A:
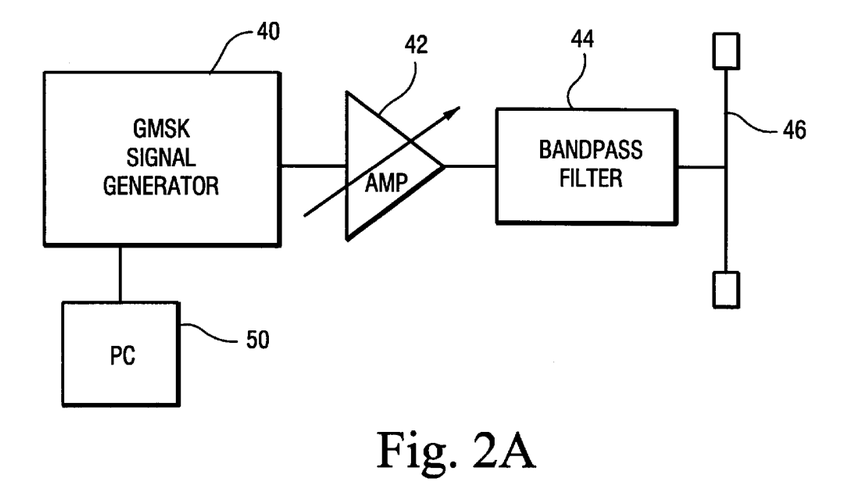
FIG. 2A is a diagram of the transmitter apparatus used in a first embodiment.

The output of the digital signal generator 40 is connected to the input of a variable amplifier 42 whose output is, in turn, connected to the input of a band pass filter 44 whose output drives an antenna 46.

Figure 2B:
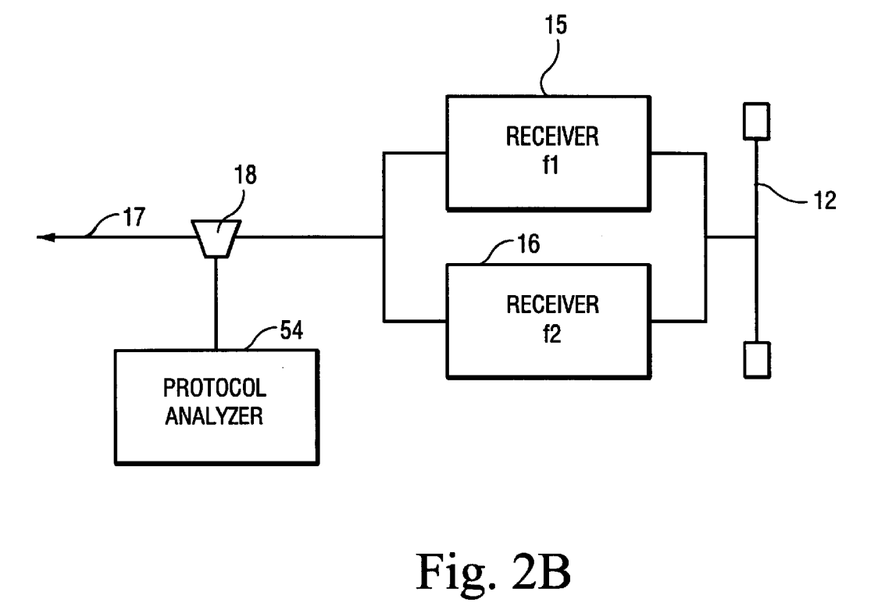
FIG. 2B is a diagram of the arrangement of a monitoring and storing device connected to a receiving antenna.

The monitoring apparatus used is a digital signal analyser 54 (more commonly known as a 'protocol analyser'). In the present embodiment, a Siemens K1103 protocol analyser 54 is used. This is connectable to the connector 18 and, once connected, can record up to one weeks worth of control data sent over the communications link 17. The protocol analyser 54 is also operable to record the time at which each data element is received.

The application of the method of the present embodiment to provide information enabling an advantageous location of a microcell in the sector S1 of the cell illustrated in FIG. 1 will now be described.

A user carrying out the test analyses a map of the sector S1 and might identify two locations, namely a railway station 20 and a shopping mall 30 as possible suitable locations for a microcell.

In order to determine which location is to be preferred, the user first synchronises the internal clocks within the PC 50 and within the protocol analyser 54. Thereafter he or she connects the protocol analyser (FIG. 2B, 54) to the connector 18 and programs it to record both the RX_QUAL values and timing advance values transmitted by mobile phones being handled by the base station 10 for a period of, say, 15 hours.

Figure 3:
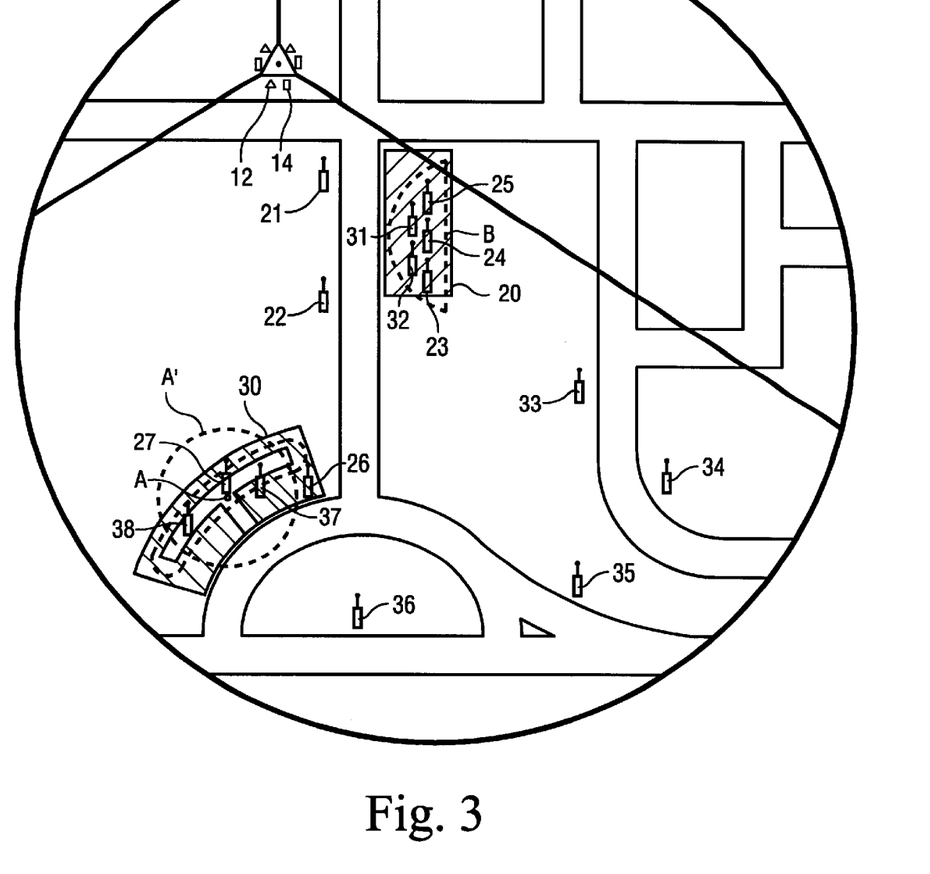
FIG. 3 is a map similar to FIG. 1 but additionally showing mobile phone usage within the area at a given instant.

Then, he or she transports the transmitter apparatus (FIG. 2A) to the shopping mall 30 and sets it up at position A in the centre of the shopping mall. (FIG. 3).

The user then runs the software stored on the PC 50 and thereby causes it to command the digital signal generator 40 to issue a one-second long burst of interference on the transmit carrier band frequencies of the transmitter 12 every minute on the minute from 8 a.m. to 8 p.m.

Once those parameters have been entered, and on the time for transmission of an interfering burst being neared, the PC 50 sends a control signal to the digital signal generator 40 to cause it to output, at the allotted time, a first one-second long interfering burst within the first transmit carrier band (carrier band 1). The interfering signal represents a pseudo-random bit sequence. The first interfering burst is immediately followed by a second one-second long interfering burst within the second transmit carrier band (carrier band 2). The signals output by the digital signal generator 40 are passed through the variable amplifier 42 and thereafter through the band pass filter 44 to ensure that frequencies outside the carrier transmit bands are not affected and then onto an antenna 46, which, in this example, is omnidirectional.

At the end of the day's tests, data concerning downlink reception quality and timing advance is downloaded from the protocol analyser 54 to a PC. Methods for doing this are straightforward to those skilled in the art.

Figure 4:
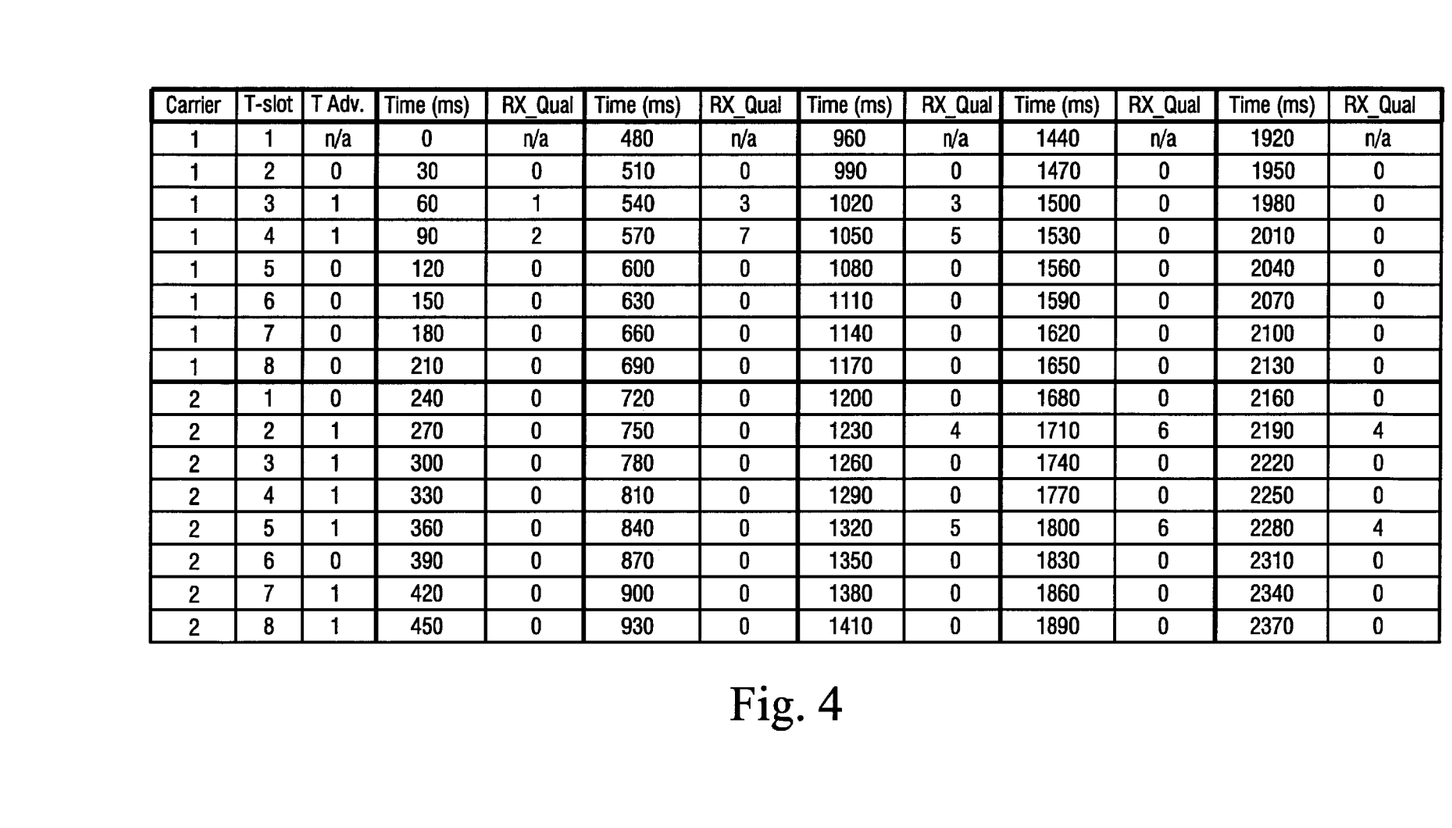
FIG. 4 is a table containing data collected concerning that usage around a first test site.

Concentrating, by way of example, on the interfering burst transmitted by the transmitter apparatus (FIG. 2A) from position A at precisely midday, and assuming that the distribution of active mobile phones 21–27, 31–38 is as shown in FIG. 3, the data downloaded from the protocol analyser 54 relating to the interference burst transmitted at midday might look like that shown in FIG. 4. The person carrying out the method of the present invention does not know either the number of active phones or their distribution and must derive salient features of that distribution from the data recorded by the protocol analyser. How that is achieved in the present case is explained below.

Data concerning the operation of mobile phones at midday might be arranged in table form (FIG. 4). The two leftmost columns of the table define the sixteen downlink channels from the base transceiver station 10 to the mobile phones 21–27, 31–38. As stated above, one of these channels is designated as a broadcast control channel (carrier band 1, timeslot 1). The column headed 'T Adv' contains the timing advance value that was stored in relation to each of the mobile phones 21–27, 31–38 that were operational at midday. Because the cell only has a radius of 1 km, the maximum value of the timing advance is 1 (However, as stated above the value is only an approximate indication of the distance between the mobile phone and the base station 10, so, in practice, it is likely that a value of 2 would occasionally be seen). The column headed "Time (ms)" indicates the time of the measurement in milliseconds past midday. The neighbouring RX_QUAL column indicates the three-bit downlink quality measure referred to above.

As stated above, in the present example, on the instant of midday, the PC 50 controls the transmitter apparatus (FIG. 2A) to output an interfering burst representing a pseudo-random sequence of bits in transmit carrier band 1 for a one-second period beginning at midday exactly. Hence, any mobile phone 27 within range of that interfering transmission which is receiving signals within that carrier band will experience interference within that one-second time period. However, since the value output by the mobile phone 27 relates to the average quality over the preceding 480 ms period, only the data transmitted later than 480 ms after the start of the burst and before the end of the burst represent periods affected by the interfering signal for the whole of their duration.

Following the assumption stated above, the RX_QUAL values relating to the respective sixteen channels are transmitted, in turn, at 30 ms intervals. The measurement transmitted at midday exactly relates to carrier band 1, timeslot 1. Hence, the measurements relating to the eight channels within carrier band 1 are transmitted in a first group between midday and 210 ms past, then in a second group between 480 ms and 690 ms past, and later in a third group between 960 ms and 1170 ms past. Measurements in the first group do not reflect the true effect of the interference because they represent a measurement interval which began before midday. The last six measurements in the third group are similarly problematical in that they represent a measurement interval which continued beyond the cessation of the interfering signal. However, all the measurements in the second group relate to measurement intervals throughout which the interfering signal was present. Hence, those measurements are used in later analysis.

Analogously, it will be realised that the group of measurements received from 1680 ms to 1890 ms past midday truly reflect the effect of the burst of interference (within carrier band 2) transmitted between 1 and 2 seconds past midday. Hence, those measurements are also used in later analysis.

Figure 6:
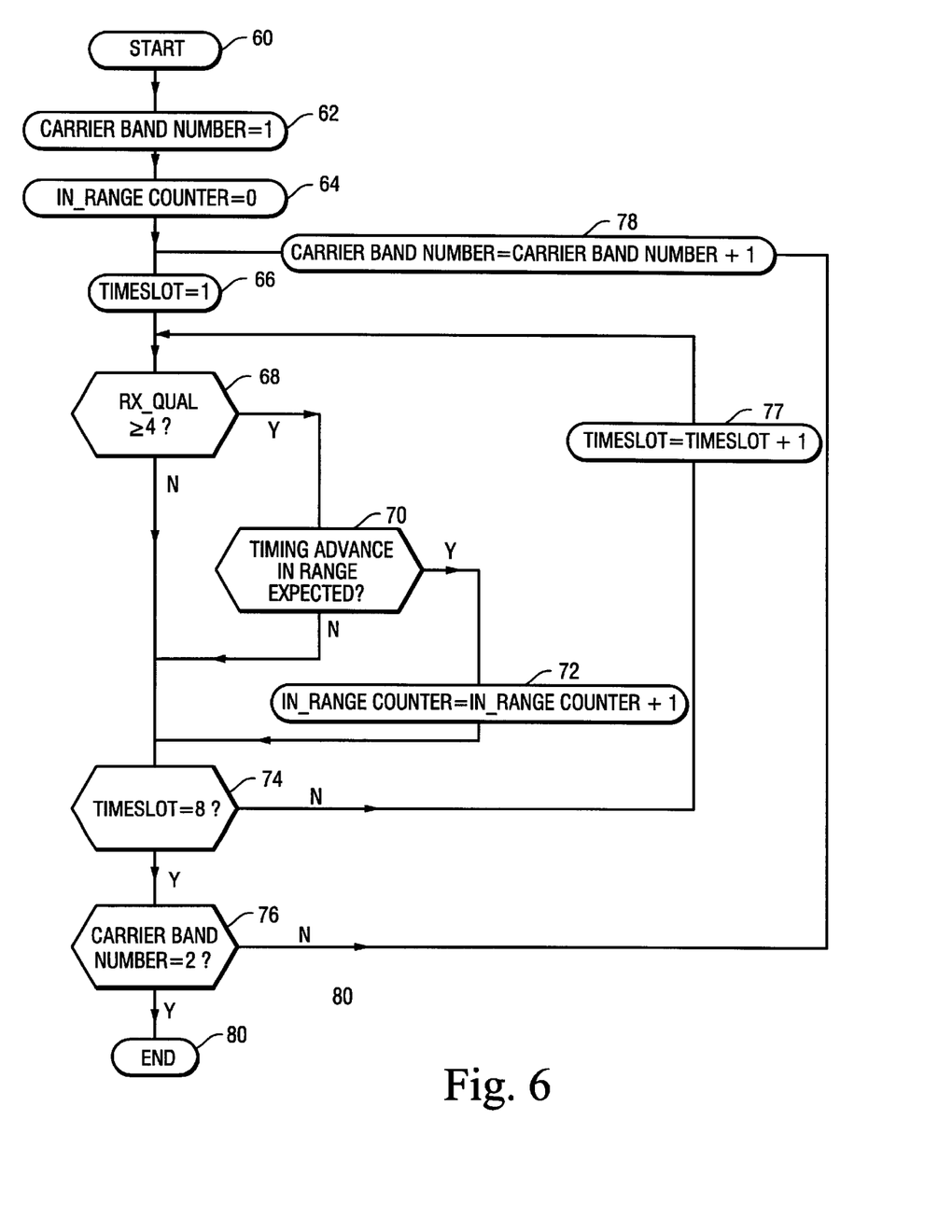
FIG. 6 illustrates a computer program executable to establish how many mobile phones were affected by the transmission of an interfering signal.

Having selected the two groups of measurements representing the quality of the downlink as affected by the two interfering signal bursts, the measurement data in those groups can then be processed by the algorithm illustrated in FIG. 6. It will be realised that, in practice, data relating to every interfering burst transmitted during the twelve-hour test period will be operated on by an analysis program. This would enable a picture of mobile phone usage in the area over the course of those twelve hours to be investigated. However, the operation of the program is illustrated only in relation to the measurements taken at midday. The program could be implemented using a personal computer which has the measurement data referred to above loaded into its memory. As stated above, the timing advance value gives an indication as to the distance between a mobile phone and the base transceiver station. Hence, high RX_QUAL values can be deemed to be the result of interference other than that caused by the present test if that distance is significantly different from the distance between the base transceiver station and the test area. Given that the test area surrounding the centre A of the shopping mall 30 lies approximately 0.75 km from the base transceiver station, only those mobile phones having a timing advance of one (and therefore being 0.5 km–1 km distant from the base transceiver station 10) can be deemed to have been affected by the interfering burst.

On executing the program, steps 62 and 64 initialise variables to be used in the routine, namely a transmit carrier band number which is initialised at one and an 'in_range' counter which is initialised at zero and is to represent the number of mobile phones which are affected by the two interfering signal bursts. The program then causes the PC's processor to execute an outer loop of instructions which itself contains a nested loop of instructions.

Within the nested loop, the program controls the processor to calculate, for the current carrier band and timeslot whether the RX_QUAL value is greater than four (step 68). If that value is greater than four, then a further comparison is carried out to see whether the timing advance value is within the expected range (step 70). If the timing advance value is within the expected range, then the 'in_range' counter is increased by one (step 72), otherwise it is unchanged. At the end of the loop, a check is made as to whether a timeslot number (represented by a variable 't_slot' has reached eight (step 74), if it has not then it is increased by one (step 77) and the loop is repeated, if it has then control is returned to the outer loop.

The outer loop of instructions begins with the initialisation of the variable 't_slot' to one (step 66). Thereafter the nested loop of instructions is carried out. Once that operation is completed, a check is made as to whether the carrier band number has reached 2 (step 76): if it has not then it is increased by one (step 78) and the outer loop of instructions is repeated; if it has then the program ends (step 80). Clearly, if n carrier bands are allocated to a sector being investigated then the loop will be repeated n times before the program ends.

Hence, on running the program to analyse data including the selected groups of measurements taken immediately after midday, the nested loop of instructions is first repeated eight times to enable each of the eight RX_QUAL values and timing advance values relating to carrier band 1 to be assessed. It will be seen that only one channel is significantly affected, namely carrier 1, timeslot 4. Thus, when the variable 't_slot' has reached 4, the program passes to step 70 where the timing advance is compared to one. Since the timing advance for that channel equals one, 'in_range' is incremented to one (step 72). For each of the other timeslots, it is determined that the RX_QUAL value is not as high as four and steps 70 and 72 are not carried out.

Since the channel number is then deemed to be less than 2 in step 76 the outer loop of instructions is then performed.

Firstly, the carrier band is incremented by 1 in step 78, and the 't_slot' variable reset to one at step 66. Thereafter, the nested loop of instructions is carried out on the data gathered in relation to the interfering burst transmitted within carrier band 2. Both timeslot 2 and timeslot 5 have RX_QUAL values greater than 4 and both have a timing advance equal to one.

Hence, instruction 72 is carried a further two times to set 'in_range' equal to three.

The person analysing the data is therefore able to derive that three mobile phones were significantly affected by the interfering signal burst at midday (this follows from the true distribution being as shown in FIG. 3: mobile phones 27,37,38 were significantly affected). It can be deduced that, if a transceiver outputting a signal of similar power to that output by the test equipment were to have been installed at a location A in the centre of the shopping mall 30 then three mobile phones would have been handled by that transceiver at midday. In practice, the stored data in relation to all the day's tests would be analysed in a similar way to generate more statistically significant conclusions concerning the amount of traffic that would be handled by the proposed transceiver.

Figure 5:
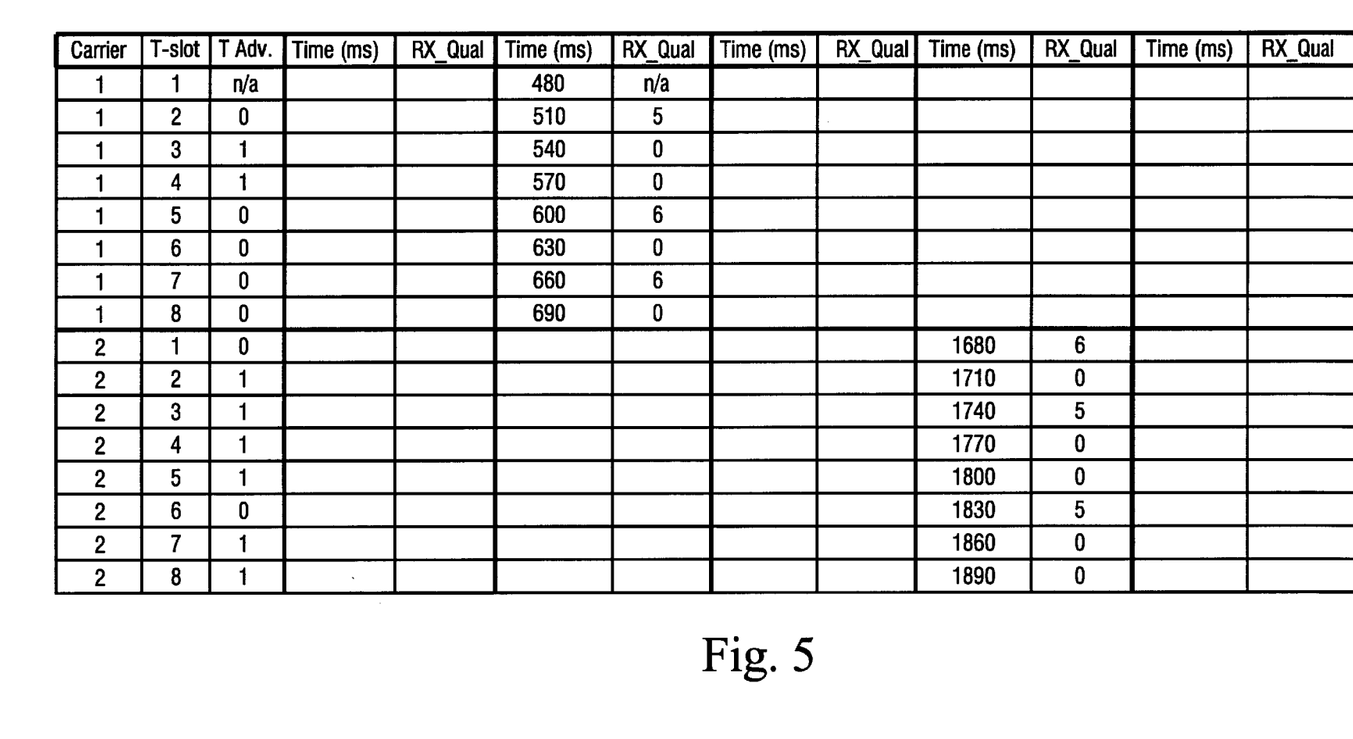
FIG. 5 is a table containing data collected concerning that usage around a second test site.

The operator could also carry out a similar test to that carried out in the shopping mall using a wall-mounted antenna (this would have a semi-circular coverage area) in the railway station 20 at a location B. This test might be carried out over the same twelve-hour time period but with interference bursts staggered in time relative to those produced at the location A. For example, the interference bursts at location B could take place once a minute at thirty seconds past the minute. Using a second transmitter apparatus similar to that illustrated in FIG. 2A, the relevant data reflecting the interference burst beginning at thirty seconds past midday might be as seen in FIG. 5. Only those selected groups of data which reflect the full effect of the interfering signal are illustrated. For the reasons discussed above, only those groups operated upon by the algorithm are illustrated in FIG. 6.

As mentioned above, the timing advance value is checked to be consistent with the position of the interfering antenna before it is assumed that a bad quality report was caused by an interfering signal. Hence, in relation to the railway station 20, the test area lies entirely within a 0.5 km radius of the base transceiver station 10, requiring the timing advance associated with a particular channel to be zero before it can be assumed that a high RX_QUAL value is caused by the test apparatus.

Examining the data shown in FIG. 5, it can be seen that the timing advance value associated with the channel represented by carrier band 2, timeslot 3 is one, indicating that the mobile phone utilising that channel is in fact more than 0.5 kilometres from the base transceiver station 10. Since the effective field of the test transmitter lies entirely within a 0.5 kilometre radius of a base transceiver station 10, it can be assumed that this poor quality report has been caused by other factors. Hence, that entry does not cause the 'in_range' counter to be incremented and the number of mobile phones in range of the midday interference burst is calculated to be five (again this is consistent with the true distribution of phones illustrated in FIG. 3).

By building up similar counts for other interfering signals issued during a day, the number of mobile phones which would hand over to a microcell transceiver mounted in the railway station 20 can be deduced and compared to the number of mobile phones which would hand over to a transceiver placed in the shopping mall 30.

Then, the transceiver which would handle the most traffic at the times of day when the sector S1 is reported to be congested can be found, and hence a preferred location for a microcell transceiver deduced.

It will be seen how the above embodiment enables mobile phone usage within different areas to be investigated using less complex equipment than has hitherto been achieved.

In the above example, the tests allow a comparison of the effectiveness of an omnidirectional antenna located at a location A and a wall-mounted antenna (giving a semi-circular coverage area) at a location B.

In addition to carrying out the above measurements relating to the shopping mall 30, other shapes of coverage areas could be investigated. For example, a YAGI antenna (configured to provide a cigar-shaped coverage area—illustrated by dot-dash lines in FIG. 3) could be used at location A. Again, these measurements might be carried out during the same twelve-hour period (the interference bursts could be staggered in relation to the other two sets of interference bursts, for example they could be produced at fifteen seconds past each minute). An additional advantage can be gained by connecting both the YAGI antenna and the omnidirectional antenna to the same GMSK digital signal generator and providing a time-dependent switching arrangement to send the signal to whichever antenna is required to provide an interference burst at that time. The effectiveness of the two types of antenna could then be investigated and the better one selected for use in the proposed microcell.

Equally, other sizes of coverage areas could be investigated. For example, a further measurements could be made in which the variable amplifier 44 is adjusted to provide a signal having a lower power. It will be realised that these too might be carried out in the same twelve-hour period using the same GMSK digital signal generator and a time dependent control for the degree of amplification provided by the variable amplifier 44. Alternatively, of course, such measurements could be made during a different test period. The effectiveness of the different interfering signal powers could then be used to decide how powerful the transceiver installed to provide the microcell should be.

The present embodiment might be further improved by comparing the selected groups of measurements with groups of measurements relating to time periods during which the interfering signal is not present. For example, the decision step 76 might compare the difference between the RX_QUAL value present during interference and the RX_QUAL value at other times with a threshold value. In this way, the effect of interference sources other than the transmitter apparatus can be discounted and the accuracy of the conclusions of the tests can be improved.

In other embodiments, the consideration of timing advance could be omitted, instead being replaced by a comparison of the difference between the RX_QUAL value present during interference and the RX_QUAL value at other times with a threshold value. The advantage of using such a comparison is that it potentially discriminates between mobile units on the basis of direction as well as distance. Also, reflections from buildings and the like lead to the timing advance not being an entirely reliable indicator of the distance between a mobile unit and a base station.

Although the description of the above embodiment concentrates on mobile telephones the invention is also applicable to other mobile communication devices that are capable of transmitting and/or receiving text messages, facsimile, video or other information.

Also, the present invention might also be used to locate transceivers in a smaller scale network, for instance a network comprising a plurality of transceivers within an office building that allows persons in the building to communicate using cordless telephones. The invention will also be useful in relation to the proposed new generation of mobile telephones which will operate as cordless telephones when inside buildings and the like and as present day mobile telephones outside.

Finally, it might be that a hotspot area extends across the boundary between two sectors or two cells. In that case, a first set of interfering transmissions can be made at the one or more frequencies associated with one of the sectors and a second made at the one or more frequencies associated with the other of the sectors. Then, by comparing the analysed data, it can be estimated how much traffic would be taken from each of the sectors, were the additional transceiver to be placed at a candidate location. In this way, it can be ensured that an additional transceiver is installed so as to take traffic from the more congested of the two sectors.

What is claimed is:

1. A method of estimating the amount of communications traffic that would be routed via an additional transceiver installed at a candidate transceiver location within the coverage area of a communications network having one or more network transceivers for providing wireless communication between the network and mobile communication units, the mobile units being operable to send reception data concerning downlink reception to the network, said method comprising the steps of:

operating a transmitter to transmit an interference signal from said candidate location to interfere with reception by mobile units within range of the transmission; and analysing at least reception data concerning downlink reception during periods associated with transmission of said interference signal to find a measure indicative of the amount of communications traffic affected by said interfering transmission; and thereby estimating the amount of communications traffic that would be routed via said additional transceiver installed at said proposed location.

2. A method according to claim 1 wherein said interfering signal transmission step comprises transmitting said interfering signal for one or more spaced time periods, each being less than ten seconds in duration.

3. A method according to claim 2 wherein said interfering signal bursts have a duration of less than 2.5 seconds.

4. A method according to claim 1 wherein:

said network comprises a plurality of network transceivers, each being allotted one or more frequency bands, and communicating with mobile units currently routed via them by transmitting and receiving signals within said frequency bands; and said transmission step comprises transmitting a signal to interfere selectively with one or more frequency bands allotted to respective chosen transceivers and thereby estimate the amount of communications traffic which would be routed via the transceiver installed at said proposed location instead of being routed via one or more chosen transceivers.

5. A method according to claim 1 wherein said transmission step comprises:

transmitting a first interfering signal having a first power;

transmitting a second interfering signal having a second power; and said analysing step further comprises the step of calculating respective measures indicative of the amount of communications traffic affected by the first and second interfering signals and thereby estimating the respective amount of communications traffic that would be routed via said additional transceiver transmitting at the first and second power installed at said proposed location.

6. A method according to claim 5 wherein said first and second interference signals are interposed between one another.

7. A method according to claim 1 wherein:

said transmitting step comprises transmitting an interference signal from first and second candidate locations, the interference signals from the first location being interposed with the interference signals from the second location; and the method further comprises the step of switching the output of said transmitter apparatus between said first and second location.

8. A method according to claim 1 wherein said analysis step further comprises analysing reception data concerning one or more time periods adjacent to the said periods associated with the transmission of the interfering signal.

9. A method according to claim 1 wherein said mobile units are further operable to send data indicative of their distance from the transceivers which are currently handling them to the network;

said method further comprising the step of analysing said distance data to discount, in finding said measure, communication traffic for which said distance data is inconsistent with the area of interfering signal transmission.

10. A transmitter apparatus comprising:

means arranged in operation to generate an interference signal; means arranged in operation to transmit an electromagnetic signal based on said interference signal to interfere with communication between one or more mobile communication units and a communications network, said communications network comprising: one or more network transceivers for providing wireless communication between the network and mobile communication units, the mobile units being operable to send data concerning downlink reception to said network.

11. A transmitter according to claim 10 which is arranged to transmit one or more interfering electromagnetic signals, each having a duration of less than 10 seconds.

12. A transmitter according to claim 11 which is arranged to transmit one or more interfering electromagnetic signals, each having a duration of less than 2.5 seconds.

13. A transmitter according to claim 10 for use in relation to a communications network comprising one or more network transceivers, each being allotted one or more frequency bands, and communicating with mobile units currently routed via them by transmitting and receiving signals within said frequency bands, said transmitter further comprising:

frequency selection means operable to select the frequencies of the interfering electromagnetic signals to interfere selectively with the frequency bands allotted to a chosen network transceiver.

14. A transmitter according to claim 10 further comprising a power level selection means operable to cause the interfering signal output by said transmitter to have a selected power.

15. A candidate additional transceiver location evaluation kit comprising:

a transmitter according to claim 10; and an apparatus arranged to monitor and store said reception data concerning downlink reception.

16. A transmitter arranged to transmit a signal to interfere with communication between one or more mobile communication units and a communications network, said communications network comprising: one or more network transceivers for providing wireless communication between the network and mobile communication units, the mobile units being operable to send data concerning downlink reception to said network.

17. A program storage device readable by a processing apparatus, said device tangibly embodying a program of instructions executable by the processor to perform method steps for carrying out the reception data analysis step of the method of claim 1, said method steps comprising:

obtaining data representing the time and duration of said interfering signal transmissions;

obtaining downlink reception quality data measured during interfering signal transmissions;

counting the number of occasions on which quality falls below a predetermined threshold, and thereby obtaining a measure of the amount of traffic affected by said interfering signal.

18. A program storage device according to claim 17 wherein said method steps further comprise:

obtaining data representing a distance between the network transceiver and the mobile unit operating over said communications link; and discounting those downlink reception quality data measurements where said distance is greater than the threshold determined on the basis of the range of said interfering signal transmissions.

* * * * *